(12) United States Patent
Palazzo et al.

(10) Patent No.: US 12,731,872 B1
(45) Date of Patent: Sep. 8, 2026

(54) MINIATURE ELECTROCHEMICAL CELL HAVING A CURRENT COLLECTOR/ACTIVE MATERIAL SUBASSEMBLY WELDED TO THE INNER SURFACE OF A LID OR BASE PLATE

(71) Applicant: Greatbatch Ltd., Clarence, NY (US)

(72) Inventors: Marcus J. Palazzo, Wheatfield, NY (US); Ho chul Yun, East Amherst, NY (US); Paul T. Hallifax, Gasport, NY (US); Sourabh Biswas, Milford, MA (US)

(73) Assignee: Greatbatch Ltd., Clarence, NY (US)

( * ) Notice: Subject to any disclaimer, the term of this patent is extended or adjusted under 35 U.S.C. 154(b) by 870 days.

(21) Appl. No.: 18/093,620

(22) Filed: Jan. 5, 2023

Related U.S. Application Data

(60) Provisional application No. 63/297,471, filed on Jan. 7, 2022.

(51) Int. Cl.
*H01M 50/566* (2021.01)
*H01M 50/117* (2021.01)
(Continued)

(52) U.S. Cl.
CPC ....... *H01M 50/566* (2021.01); *H01M 50/117* (2021.01); *H01M 50/1243* (2021.01);
(Continued)

(58) Field of Classification Search
CPC ............. H01M 50/107; H01M 50/147; H01M 50/188; H01M 50/559; H01M 50/152;
(Continued)

(56) References Cited

U.S. PATENT DOCUMENTS 5,415,959 A 5/1995 Pyszczek et al.
6,610,443 B2 8/2003 Paulot et al.
(Continued)

FOREIGN PATENT DOCUMENTS

EP 1441400 A1 7/2004
EP 1914818 A1 4/2008
(Continued)

*Primary Examiner* — Matthew T Martin
*Assistant Examiner* — Bartholomew A Hornsby
(74) *Attorney, Agent, or Firm* — Michael P. Scalise

(57) ABSTRACT

A miniature electrochemical cell of a primary or secondary chemistry having a total volume that is less than 0.5 cc is described. The cell casing comprises an annular sidewall connected to a base plate opposite a lid. A sealing glass forms a hermetic glass-to-ceramic seal with a dielectric material contacting a lower portion of the annular sidewall and a glass-to-metal seal with the base plate. A current collector supporting an electrode active material is connected to an inner surface of the lid using a parallel gap welding process. The lid is then welded to an upper edge of the annular sidewall to close the casing. A second, opposite polarity active material is electrically connected to the base plate. The lid also has a sealed electrolyte fill port that is axially aligned with an annulus residing between the inner surface of the annular sidewall and the first and second active materials.

12 Claims, 5 Drawing Sheets

(51) Int. Cl.

| | |
|---|---|
| ***H01M 50/124*** | (2021.01) |
| ***H01M 50/131*** | (2021.01) |
| ***H01M 50/169*** | (2021.01) |
| ***H01M 50/184*** | (2021.01) |
| ***H01M 50/186*** | (2021.01) |
| ***H01M 50/191*** | (2021.01) |
| ***H01M 50/545*** | (2021.01) |
| ***H01M 50/645*** | (2021.01) |

(52) U.S. Cl.
CPC ....... *H01M 50/131* (2021.01); *H01M 50/169* (2021.01); *H01M 50/184* (2021.01); *H01M 50/186* (2021.01); *H01M 50/191* (2021.01); *H01M 50/545* (2021.01); *H01M 50/645* (2021.01)

(58) Field of Classification Search
CPC ............. H01M 50/169; H01M 50/184; H01M 50/102; H01M 50/148; Y02E 60/10
See application file for complete search history.

(56) References Cited

U.S. PATENT DOCUMENTS

| | | | | |
|---|---|---|---|---|
| 7,128,765 | B2 | 10/2006 | Paulot et al. | |
| 10,446,825 | B2 | 10/2019 | Voss et al. | |
| 10,957,884 | B1 | 3/2021 | Dianetti et al. | |
| 2011/0097623 | A1 | 4/2011 | Marinis et al. | |
| 2012/0100406 | A1* | 4/2012 | Gaugler ............ | H01M 10/0427 29/623.2 |
| 2022/0166095 | A1 | 5/2022 | Dianetti et al. | |

FOREIGN PATENT DOCUMENTS

| | | | |
|---|---|---|---|
| EP | 3926740 | A1 | 12/2021 |
| WO | 2017025858 | A1 | 2/2017 |

* cited by examiner

MINIATURE ELECTROCHEMICAL CELL HAVING A CURRENT COLLECTOR/ACTIVE MATERIAL SUBASSEMBLY WELDED TO THE INNER SURFACE OF A LID OR BASE PLATE

CROSS-REFERENCE TO RELATED APPLICATION

This application claims priority to U.S. provisional patent application Ser. No. 63/297,471, filed on Jan. 7, 2022.

BACKGROUND OF THE INVENTION

1. Field of the Invention

The present invention relates to the conversion of chemical energy to electrical energy. More particularly, the present invention relates to an electrochemical cell having a total size or volume that is less than 0.5 cc. Such so-called miniature electrochemical cells enable numerous new and improved medical device therapies. Miniature electrochemical cells are defined as those having a size or total volume that is less than 0.5 cc.

2. Prior Art

U.S. Pub. No. 2022/0166095 to Dianetti et al., which is assigned to the assignee of the present invention and incorporated herein by reference, describes a miniature electrochemical cell housed in a metallic casing consisting of three main components: a base plate supporting a cylindrically-shaped annular sidewall having an open upper end closed with a cover plate or lid. The base plate, annular sidewall and lid are each of a metal material, for example, titanium.

The lower edge of the annular sidewall is selectively coated with a dielectric or ceramic material to provide electrical isolation of the to-be-housed first active material, for example, a cathode active material, from the metallic annular sidewall.

The base plate has an annular channel, and a pre-form of glass is positioned in the channel. The lower edge of the annular sidewall is seated on the glass pre-form and this subassembly is then heated to flow and wick the glass part-way up the height of the dielectric material coating the inner and possibly the outer surfaces of the annular sidewall. Upon cooling, the glass forms a hermetic glass-to-ceramic seal with the dielectric material contacting the annular sidewall and a glass-to-metal seal with the base plate. The thickness of the sealing glass combined with the glass seal bonds at the base plate and at the dielectric or ceramic material coating the annular sidewall are sufficient to ensure electrical isolation between the base plate and the supported annular sidewall. Moreover, since the glass seals against three surfaces of the annular sidewall, which are the lower annular edge and both the inner and outer sidewall surfaces adjacent to the lower edge, the ability to generate tensile stresses along any single face is greatly reduced. That way, the glass seal between the annular sidewall and the base plate is better capable of withstanding heat generated when the lid is welded to the upper end of the annular sidewall without being structurally compromised.

The '095 publication to Dianetti et al. describes that a layer of a first active material, for example, a cathode active material, is deposited into the cavity formed by the base plate/annular sidewall subassembly. The cathode active material is in electrical continuity with the base plate, which serves as the positive terminal for the cell, but which is electrically isolated from the annular sidewall by the above-described sealing glass and dielectric material. A separator is supported on the exemplary cathode active material.

Separately, a current collector supporting a layer of a second active material, for example, an anode active material, is contacted to an inner surface of the lid. The metallic lid/current collector/second active material subassembly is then seated on an inner step of the annular sidewall. The lid contains an embossed rim around its perimeter. When the lid and sidewall are welded together, this rim is utilized to absorb energy and act as a filler material into the weld joint. The energy absorption from the embossed rim helps mitigate any cracking of the glass-to-ceramic seal at the annular sidewall and the glass-to-metal seal at the base plate. In this construction, the lid connected to the annular sidewall is in electrical continuity with the anode active material to thereby serve as the negative terminal for the cell.

The lid also has an electrolyte fill port positioned close to but spaced inwardly from its annular peripheral edge. An annulus resides inside the casing between the inner surface of the annular sidewall and the electrode assembly comprising the cathode active material and the spaced apart anode active material. The electrolyte fill port is axially aligned with this annulus, which allows the casing to be filled with electrolyte using a vacuum filling process so that the activating electrolyte readily wets the anode and cathode active materials and the intermediate separator. Without the fill port being axially aligned with the annulus between the electrode assembly and casing sidewall, it is sometimes difficult for electrolyte to sufficiently wet the opposite polarity electrode active materials to promote acceptable cell discharge.

Finally, the electrolyte fill port is sealed with a closure member welded therein or by melting the material of the lid into a solid mass closing the fill port.

However, a vexing problem in a miniature electrochemical cell having a size or total volume that is less than 0.5 cc is the connection of the current collector to the inner surface of the lid. In miniature electrochemical cells, such as those described in the above-referenced '095 publication to Dianetti et al., this connection is made using a conductive paste. However, a conductive paste can sometimes be difficult to dispense into the proper position and has a thickness that detracts from the miniature electrochemical cell's volumetric efficiency.

Thus, there is a need for an improved electrical connection between a current collector and lid in a miniature electrochemical cell of the type described in the above referenced '095 publication to Dianetti et al. In that respect, the present electrochemical cell provides a process for welding a current collector supporting an electrode active material as a pre-assembly to the inner surface of the lid serving as a terminal for the cell. The present invention also describes a process for welding a current collector supporting an electrode active material as a pre-assembly to the base plate serving as an opposite polarity electrode for the cell.

SUMMARY OF THE INVENTION

To help improve the structural integrity of the electrical connection of a current collector to the inner surface of a casing lid or base plate, the current collector supporting an electrode active material as a pre-assembly is welded to the lid or to the base plate using a parallel gap welding process. Then, in the case of the lid and in a similar manner as previously described with respect to the miniature electrochemical cell of the above-referenced '095 publication to Dianetti et al., the metallic lid/current collector/electrode active material subassembly is seated on an inner step of the annular sidewall, and the lid is welded to the annular sidewall. This serves to close the casing and complete the terminal for the electrode active material electrically connected to the lid through the intermediate current collector.

While the present cell designs are adapted for miniature electrochemical cells, they are also applicable to cells that have a total volume that is greater than 0.5 cc and are not classified as "miniature". Moreover, the present electrochemical cells are not limited to any one chemistry; they can be an alkaline cell, a primary lithium cell, a rechargeable lithium cell, a Ni/cadmium cell, a Ni/metal hydride cell, a supercapacitor, a thin film solid-state cell, and the like. One preferred chemistry for a primary electrochemical cell has a lithium anode and a silver vanadium oxide (SVO)/fluorinated carbon ($CF_x$) cathode. A preferred secondary chemistry for a lithium-ion electrochemical cell comprises a carbon-based or $Li_4Ti_5O_{12}$-based anode and a lithium metal oxide-based cathode, such as of $LiCoO_2$ or lithium nickel manganese cobalt oxide ($LiNi_aMn_bCO_{1-a-b}O_2$). Both the primary and secondary electrochemical cells are activated with a liquid electrolyte.

These and other aspects of the present invention will become increasingly more apparent to those skilled in the art by reference to the following detailed description and to the appended drawings.

DETAILED DESCRIPTION OF THE PREFERRED EMBODIMENTS

Figure 1:
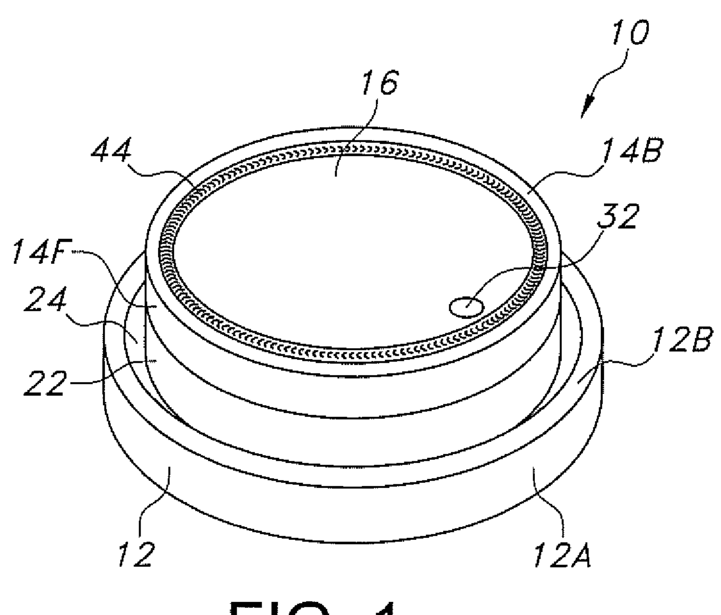
FIG. 1 is a perspective view of an electrochemical cell 10 according to the present invention.
Figure 2:
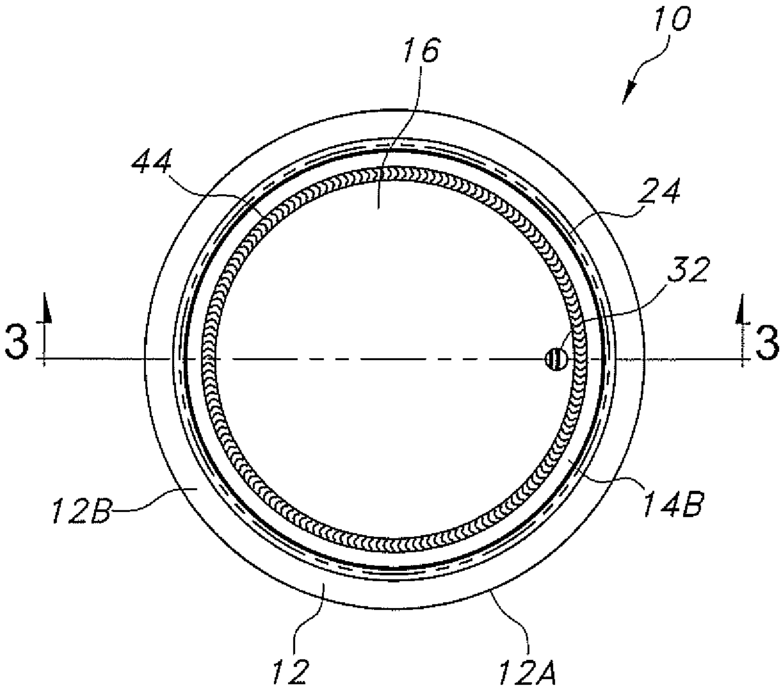
FIG. 2 is a plan view of the electrochemical cell 10 shown in FIG. 1.

Turning now to the drawings, FIG. 1 illustrates an exemplary electrochemical cell 10 according to the present invention. The electrochemical cell 10 comprises an electrode assembly housed in a hermetically sealed casing. The casing comprises a base plate 12 supporting an annular sidewall 14 having an open upper end closed by a plate-shaped cover or lid 16. The base plate 12, annular sidewall 14 and lid 16 are each of a biocompatible metal, for example, titanium. In addition to titanium, suitable materials for the base plate 12, annular sidewall 14 and lid 16 include stainless steel, mild steel, nickel-plated mild steel, but not limited thereto, so long as the metallic material is compatible for use with the other cell components.

Figure 4:
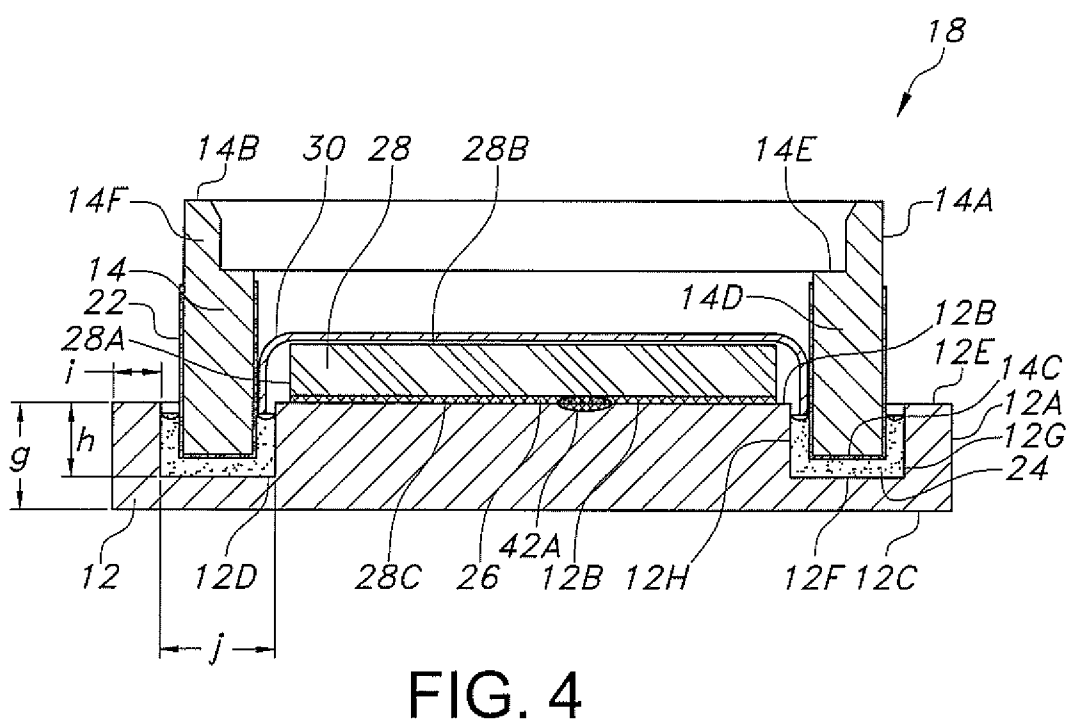
FIGS. 4 and 5 illustrate that the electrochemical cell 10 shown in FIGS. 1 to 3 is assembled from a first or casing base subassembly 18 (FIG. 4) and a second or lid upper subassembly 20 (FIG. 5).
Figure 5:
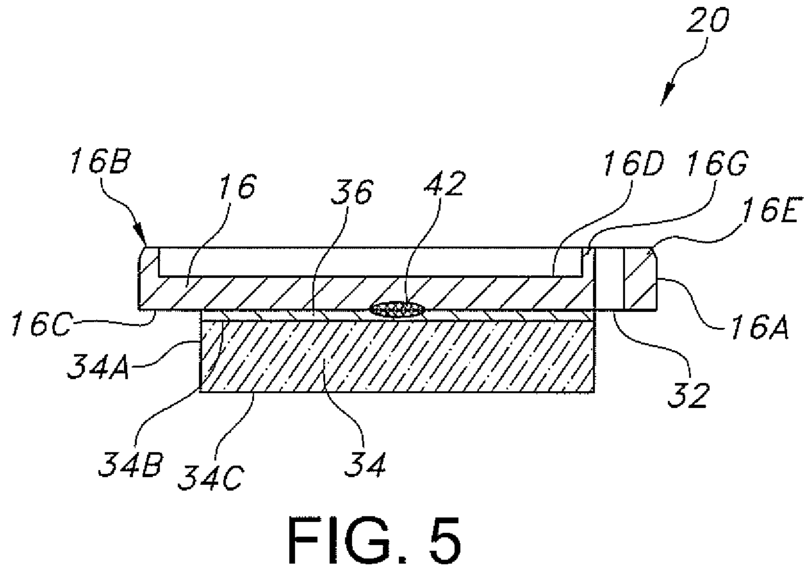

FIGS. 4 and 5 illustrate that the casing for the cell 10 is assembled from a first or base subassembly 18 (FIG. 4) and a second or lid upper subassembly 20 (FIG. 5). The base subassembly 18 comprises the base plate 12 having an annular peripheral edge 12A extending to and meeting a base plate upper surface 12B spaced from a base plate lower surface 12C. An annular channel 12D extends part-way into the thickness of the base plate 12 from the upper surface 12B but ends spaced from the lower surface 12C. The annular channel 12D is spaced inwardly from the peripheral edge 12A.

As shown in FIG. 4, the thickness of the base plate 12 is defined as the distance "g" measured from the upper surface 12B to the lower surface 12C and it ranges from about 0.012 inches to about 0.018 inches. The annular channel 12D is spaced radially inwardly from the annular edge 12A to form a channel annular rim 12E having a height "h" measured from the channel lower surface 12F to the upper surface 12B of the base plate 12, and a width "i" measured from the peripheral edge 12A to a distal surface 12G of the channel 12D. The height "h" of the channel annular rim ranges from about 0.007 inches to about 0.013 inches while the width "i" ranges from about 0.005 inches to about 0.010 inches. Finally, the channel 12D has a width "j" measured from a channel proximal surface 12H to the channel distal surface 12G that ranges from about 0.010 inches to about 0.020 inches.

FIGS. 1 to 4 further show that the annular sidewall 14 comprises a cylindrically shaped outer sidewall surface 14A extending to an upper annular edge 14B spaced from a lower annular edge 14C. The upper and lower annular edges 14B, 14C reside along respective imaginary planes that are substantially parallel to each other. An inner surface of the annular sidewall 14 has a first or lower cylindrically-shaped portion 14D extending upwardly part-way along the height of the sidewall 14 from the lower annular edge 14C to a step 14E. A second or upper cylindrically-shaped portion 14F extends upwardly from the step 14E to the upper annular edge 14B.

Figure 3:
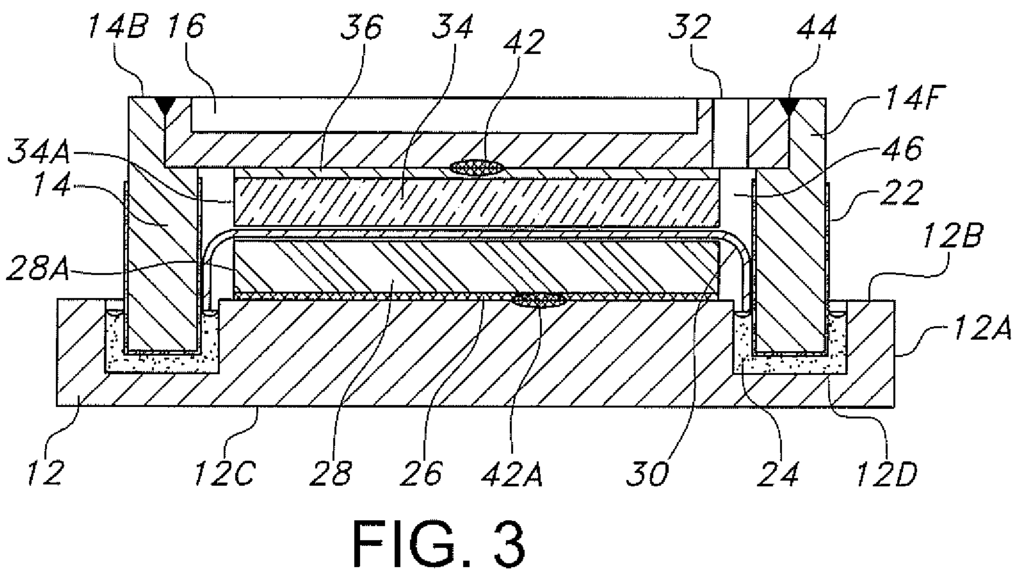
FIG. 3 is a cross-sectional view along line 3-3 of FIG. 2 showing an exemplary electrochemical cell 10 according to the present invention.

An annular layer of dielectric material 22, for example, an alumina ($Al_2O_3$) material, is coated on the lower edge 14C and the inner surface of the lower cylindrically-shaped portion 14D of the annular sidewall 14. For ease in manufacturing, the dielectric material 22 is also coated on the outer surface 14A of the sidewall 14. While the dielectric material 22 is shown in FIGS. 3 and 4 extending along the lower cylindrically-shaped portion 14D of the annular sidewall 14 to the step 14E, to function properly it need only extend along the inner portion 14D to a height that is greater than the thickness of the active material (either cathode or anode) that will subsequently nest in the casing base subassembly 18.

FIGS. 1 to 4 further show that the base plate 12 has a diameter at its annular peripheral edge 12A that is significantly greater than the outer diameter of the annular sidewall 14. To secure the base plate 12 to the annular sidewall 14, an endless ring of sealing glass 24 is nested or positioned in the previously described annular channel 12D. The lower edge 14C of the annular sidewall is then positioned on the upper surface of the glass 24. Depositing the sealing glass 24 in the annular channel 12D is achieved by several suitable methods including screen printing, dispensing, dipping into a frit paste or through the use of a pre-formed endless glass ring. Suitable sealing glasses include both vitreous and crystallizing compositions that exhibit good electrical isolation properties and form mechanical bonds with good wetting characteristics to the metals of the base plate 12 and the annular sidewall 14. Exemplary sealing glasses include, but are not limited to, Ferro IP510, Corning 1890, Schott 8422 and Schott 8629.

The base plate 12, sealing glass 24 and annular sidewall 14 comprising the casing base subassembly 18 are then heated to a temperature that is sufficient to burn off any organic binders that may be present in the glass 24 and flow the glass into intimate contact with the dielectric material 22 contacting the lower annular edge 14C and to wick part-way up and along the height of the dielectric material coating the inner surface and possibly the outer surface of the lower cylindrically-shaped portion 14D of the sidewall 14. Upon cooling, the glass 24 forms a hermetic glass-to-ceramic seal with the dielectric material coating the annular sidewall 14 and a glass-to-metal seal with the base plate 12. The sealing glass 24 has a thickness that ranges from about 0.002 inches to about 0.0025 inches between where it contacts the dielectric material 22 supported on the annular sidewall 14 and the facing distal surface 12G, lower surface 12F and proximal surface 12G of the annular channel 12D in the base plate 12. This is sufficient to ensure electrical isolation between the base plate 12 and the annular sidewall 14.

After the base plate 12 and the annular sidewall 14 are secured together by the intermediate sealing glass 24, a first current collector 26 is provided and a first electrode active material 28 is supported on the current collector 26. The current collector 26/first electrode active material 28 as a pre-assembly is then electrically and mechanically secured to the inner surface 12B of the base plate 12. As will be described in greater detail hereinafter, the current collector 26 is preferably welded to the base plate 12 using a parallel gap welding process. The electrode active material 28 preferably extends to an outer edge 28A that is spaced inwardly from the annular dielectric coating 22 on the inner surface of the lower cylindrically-shaped portion 14D of the annular sidewall 14. That way, the electrode active material 28 is in electrical continuity with the base plate 12 through the current collector 26.

While not intending to limit the present electrochemical cell 10, the electrode active material 28 has a thickness extending to its upper and lower faces 28B, 28C that ranges from about 5 μm to about 1 mm. In other embodiments, the electrode active material 28 has a thickness that is greater than 1 mm. If the electrode active material 28 is a cathode active material, suitable materials 28 for both primary and secondary systems are selected from $LiCoO_2$, $LiNiO_2$, $LiMnO_2$, TiS, FeS, $FeS_2$, $CF_x$, $Ag_2O$, $Ag_2O_2$, $Ag_2CrO_4$, silver vanadium oxide (SVO), copper silver vanadium oxide (CSVO), $V_2O_5$, $MnO_2$, and lithium nickel manganese cobalt oxide ($LiNi_aMn_bCo_{1-a-b}O_2$).

If the electrode active material 28 is a cathode active material, it is preferably mixed with a binder and a solvent prior to being deposited on the current collector 26. Binders such as, but not limited to, a powdered fluoro-polymer, more preferably powdered polytetrafluoroethylene or powdered polyvinylidene fluoride and solvents, such as but not limited to, trimethylphosphate (TMP), dimethylformamide (DMF), dimethylacetamide (DMAc), tetramethylurea (TMU), dimethylsulfoxide (DMSO), or n-methyl-2-pyrrolidone (NMP) are suitable.

In addition, up to about 10 weight percent of a conductive diluent may be added to the cathode active material 28 to improve conductivity. Suitable materials for this purpose include acetylene black, carbon black, and graphite or, a metallic powder such as powdered nickel, aluminum, titanium, and stainless steel.

A separator 30 (FIGS. 3 and 4) is positioned on top of or over the active material 28. The separator 30 preferably extends to the dielectric material 22 coating the inner surface of the lower cylindrically-shaped portion 14D of the annular sidewall 14. The separator 30 may also contact the sealing glass 24 supported on the base plate 12 and it has a thickness that ranges from about 5 μm to about 30 μm.

Illustrative separator materials include non-woven glass, polypropylene, polyethylene, microporous materials, glass fiber materials, ceramics, the polytetrafluorethylene membrane commercially available under the designations ZITEX (Chemplast Inc.), the polypropylene membrane commercially available under the designation CELGARD (Celanese Plastic Company Inc.) and DEXIGLAS (C. H. Dexter, Div., Dexter Corp.). Other separator materials that are useful with the present invention include woven fabrics comprising halogenated polymeric fibers, as described in U.S. Pat. No. 5,415,959 to Pyszczek et al., which is assigned to the assignee of the present invention and incorporated herein by reference. Examples of halogenated polymeric materials that are suitable for the present invention include, but are not limited to, polyethylene tetrafluoroethylene, which is commercially available under the name Tefzel, a trademark of the DuPont Company, polyethylenechlorotrifluoroethylene, which is commercially available under the name Halar, a trademark of the Allied Chemical Company, and polyvinylidene fluoride.

FIGS. 1 to 3 and 5 to 9 illustrate that the lid upper subassembly 20 comprises the upper plate-shaped lid 16 having an annular peripheral edge 16A extending to and meeting a lid upper surface 16B spaced from a lid inner surface 16C. An annular recess 16D extends inwardly from the upper surface 16A part-way through the thickness of the lid 16. As particularly shown in FIG. 9, the lid thickness is defined as the distance measured from the lid upper surface 16B to the lid inner surface 16C and the thickness ranges from about 0.0055 inches to about 0.025 inches. The annular recess 16D is spaced radially inwardly from the annular edge 16A to form an annular embossed rim 16E having a height "y" measured from the lid upper surface 16B to the recess surface 16D and a width "z" measured from the lid annular peripheral edge 16A to an inner surface 16F of the rim 16E. The height "y" of the embossed rim 16E ranges from about 0.0005 inches to about 0.010 inches, and the width "z" of the rim ranges from about 0.001 inches to about 0.012 inches.

Figure 9:
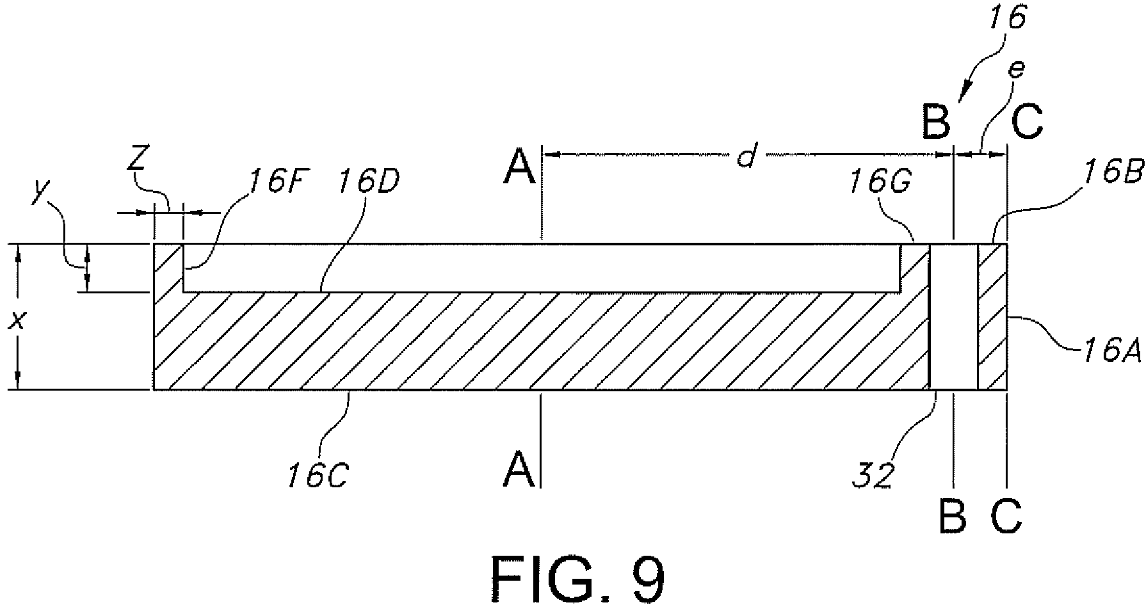
FIG. 9 is a cross-sectional view taken along line 9-9 of FIG. 8.

An electrolyte fill opening or port 32 extends through the thickness of the lid 16 at the annular embossed rim 16E. A sleeve 16G as a portion of the lid surrounds the fill port 32. The sleeve 16G is a continuous extension of the embossed rim 16E so that the sleeve and rim together define the fill port 32. In that respect, the fill port 32 resides substantially off-center in the lid 16, spaced a relatively short distance inwardly from the peripheral edge 16A. As shown in FIG. 9, the lid 16 has a longitudinal axis A-A and the fill port 32 has a longitudinal axis B-B. The distance "d" between the respective axes A-A and B-B ranges from about 0.0185 inches to about 0.30 inches. Further, the distance "e" from the longitudinal axis B-B of the fill port 32 to the closest tangent line C-C to the annular peripheral edge 16A of the lid 16 ranges from about 0.0015 inches to about 0.035 inches. Thus, the diameter of the lid 16 ranges from about 0.040 inches to about 0.67 inches and is 2× the sum of distance "d" plus distance "e". The significance of the positioning of the electrolyte fill port 32 in the lid 16 will be described in greater detail hereinafter. In any event, the fill port 32 provides an open path from the upper surface 16B to the inner surface 16C of the lid 16.

In either a primary or a secondary electrochemical system, an electrode active material 34 having an opposite polarity in comparison to the previously described electrode active material 28 is first contacted to a second current collector 36. Regardless of whether the active material 34 is an anode active material or a cathode active material, it is deposited on the current collector 36 using any one of many suitable techniques including being pressed into contact with the current collector 36, preformed into a sheet that is pressed into contact with the current collector 36, sprayed onto the current collector 36, sputtered onto the current collector 36, or coated on the current collector 36. While not intending to limit the present electrochemical cell 10, the active material 34 has a thickness extending to its upper and lower faces 34B, 34C that ranges from about 5 μm to about 1 mm. In other embodiments, the active material 34 has a thickness that is greater than 1 mm.

If an anode active material, suitable materials 34 for a secondary electrochemical system include carbon-based materials selected from coke, graphite, acetylene black, carbon black, glass carbon, hairy carbon, and mixtures thereof, or lithiated materials selected from $Li_4Ti_5O_{12}$, lithiated silver vanadium oxide, lithiated copper silver vanadium oxide, lithiated copper sulfide, lithiated iron sulfide, lithiated iron disulfide, lithiated titanium disulfide, lithiated copper vanadium oxide, $Li_xCu_wAg_yV_2O_z$ with $0.5 \le x \le 4.0$, $0.01 \le w \le 1.0$, $0.01 \le y \le 1.0$ and $5.01 \le z \le 6.5$, and mixtures thereof.

Lithium is a suitable material 34 for a primary electrochemical system and it does not require the current collector 36. Instead, lithium is directly contacted to the lid 16.

Figure 6:
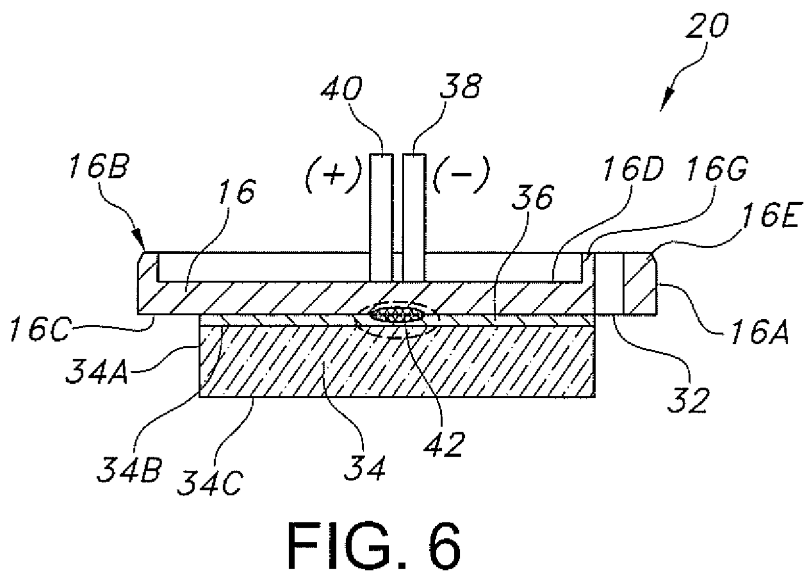
FIG. 6 is a cross-sectional view of the lid subassembly 20 shown in FIG. 5 with a current collector 36/electrode active material 34 subassembly being secured to an inner surface of the lid 16 using a parallel gap welding process according to the present invention.
Figures 7, 8:
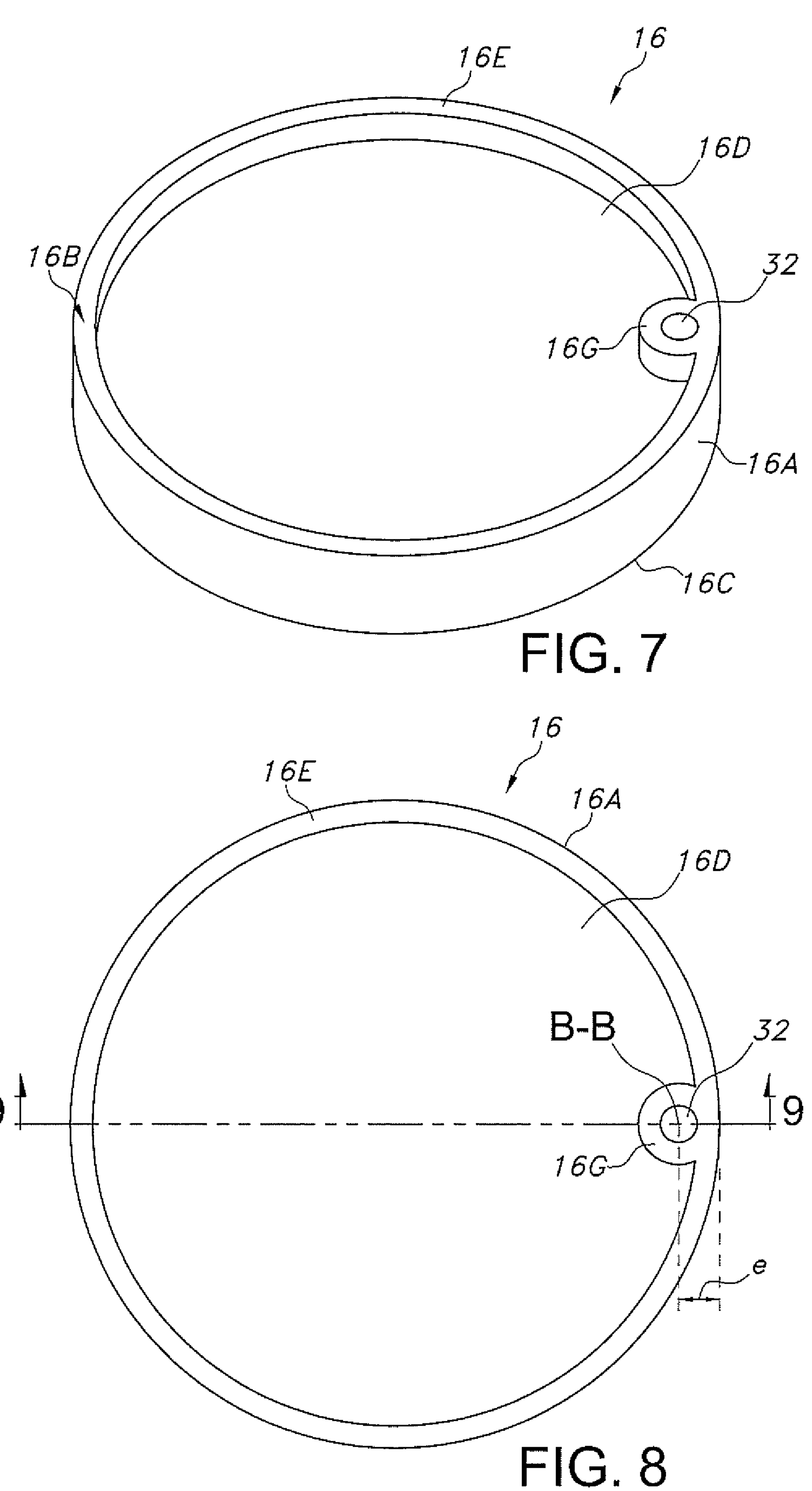
FIG. 7 is a perspective view of the lid 16 for the electrochemical cell 10 shown in FIGS. 1 to 3 having an embossed electrolyte fill port 32.
FIG. 8 is a plan view of the lid 16 shown in FIG. 7.

After the electrode active material 34/current collector 36 assembly is formed, the assembly is contacted to the lid inner surface 16C. This connection is made using a parallel gap welding or series welding process, which is ideal when only one side of the weldment is accessible to the welding electrodes (it is not practical to weld through the electrode active material 34). As shown in FIG. 6, spaced-apart opposite polarity welding electrodes 38 and 40 are moved into the recess 16D to contact the lid 16 opposite the current collector 36. Weld current from a power supply (not shown) flows from one of the electrodes, for example, weld electrode 38, through the lid 16 and partially into the current collector 36 before returning back through the lid 16 to the power supply via the second electrode 40. The resulting weld 42 between the lid inner surface 16C and the current collector 36 securely binds those parts together and provides a suitable electrically conductive pathway for discharge of the electrochemical cell 10 with the lid serving as one of the terminals for the cell.

An important aspect of using a parallel gap welding process to weld the electrode active material 34/current collector 36 assembly to the inner surface 16C of the lid 16 is that the weld 42 needs to be sufficiently spaced from the electrolyte fill port 32 so that it does not block the port.

As shown in FIG. 3, the lid 16 has a diameter that is sized to fit into the second or upper cylindrically-shaped portion 14F of the annular sidewall 14, supported on the step 14E (FIG. 4). In this seated position, the upper planar surface 16B of the lid 16 is substantially co-planar with the upper annular edge 14B of the sidewall 14. As shown in FIGS. 1 and 3, the lid 16 is hermetically secured or sealed to the sidewall 14 with an annular weld 44. In that respect, a benefit attributed to the embossed rim 16E is that it provides material that absorbs heat energy during the laser welding process and that acts as filler material at the weld joint 44.

An activating electrolyte (not shown) is then filled into the casing through the fill port 32. The fill port 32 is in fluid flow communication with an annular space or annulus 46 (FIG. 3) provided between the outer annular edges 28A and 34A of the respective electrode active materials 28, 34 and the inner surface of the lower cylindrically-shaped portion 14D of the annular sidewall or the dielectric material 22 supported on the cylindrically-shaped portion 14D and allows the casing to be filled with electrolyte using a vacuum filling process.

Without this axial alignment, the electrode assembly would need to be soaked in electrolyte and the remaining casing void volume filled with additional electrolyte prior to welding the lid 16 to the annular sidewall 14. Soaking the electrode assembly in electrolyte creates multiple problems. First, internal voids within the opposite polarity electrode active materials are not optimally filled with electrolyte without a vacuum drawing electrolyte into all available porosity. A second issue relates to the difficulty in welding the lid 16 to the annular sidewall 14 in the presence of electrolyte. Heat generated by the welding process can cause electrolyte to evaporate and form out-gassing byproducts that can contaminate the weld 44, thereby reducing weld integrity.

Thus, the purpose of the fill port 32 in fluid flow communication with the annular space 44 between the outer annular edges 28A and 34A of the opposed polarity electrode active materials 28 and 34 and the inner surface of the lower cylindrically-shaped portion 14D of the annular sidewall 14 or the inner surface of the dielectric material 22 supported on the cylindrically-shaped portion 14D is to provide an open pathway for electrolyte to flow downwardly past the upper active material 34 to wet the lower active material 28 and the intermediate separator 30. This is especially important in the miniature electrochemical cells of the present invention having a size or total volume that is less than 0.5 cc. In such small size cells, the desired volume of electrolyte is sufficient to activate the opposed polarity active materials 28, 34 without there being an overabundance of electrolyte. Without the above-described alignment of the fill port 32 and the internal annular space 44, it is sometimes difficult for the electrolyte to sufficiently wet the electrode assembly 28, 34 to promote acceptable cell discharge. Further, the distance "e" (FIGS. 7 and 8) from the longitudinal axis B-B of the fill port 32 to the closest tangent line C-C to the annular peripheral edge 16A of the lid ranging from about 0.0015 inches to about 0.035 inches provides sufficient lid material at the fill port 32 to ensure that when the fill port is hermetically welded shut, the lid will not be structurally compromised by the welding process, thereby ensuring long-term hermeticity for the electrochemical cell 10 of the present invention.

The activating electrolyte is a nonaqueous and ionically conductive material mixture serving as a medium for migration of ions between the anode and cathode active materials during conversion of ions in atomic or molecular forms which migrate from the anode active material to the cathode active material. Nonaqueous electrolytes that are suitable for the present electrochemical cell 10 are substantially inert to the anode and cathode active materials, and they exhibit those physical properties necessary for ionic transport, namely, low viscosity, low surface tension and wettability.

A suitable electrolyte has an inorganic, ionically conductive lithium salt dissolved in a mixture of aprotic organic solvents comprising a low viscosity solvent and a high permittivity solvent. The inorganic, ionically conductive lithium salt serves as the vehicle for migration of the anode ions to intercalate or react with the cathode active material 34. Suitable lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LIN(SO_2CF_3)_2$, LiSCN, $LiO_3SCF_3$, $LiC_6F_5SO_3$, $LiO_2CCF_3$, $LiSO_6F$, $LiB(C_6H_5)_4$ and $LiCF_3SO_3$, and mixtures thereof.

Low viscosity solvents useful with the present electrochemical cell 10 include esters, linear and cyclic ethers and dialkyl carbonates such as tetrahydrofuran (THE), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, Y-butyrolactone (GBL), N-methyl-pyrrolidinone (NMP), and mixtures thereof.

The fill port 32 is preferably closed with a closure plug (not shown) that has been press-fit into the opening 32 defined by the sleeve 16G as a continuous extension of the embossed rim 16E. This is followed by welding the closure plug to the embossed rim 16E and sleeve 16G. Alternately, the fill port 32 is closed by directing a laser beam at the embossed rim 16E and sleeve 16G to cause the rim and sleeve to flow into and hermetically seal the port 32. Suitable closure systems for sealing an electrolyte fill port are described in U.S. Pat. No. 6,610,443 to Paulot et al., 7, 128, 765 to Paulot et al. and 10,446,825 to Voss et al. These patents are assigned to the assignee of the present invention and incorporated herein by reference.

For example, the preferred anode active material for a primary system is lithium metal, one preferred cathode active material is $CF_x$ and the preferred electrolyte is 0.8M to 1.5M $LiAsF_6$ or $LiPF_6$ dissolved in a 30:70 mixture, by volume, of propylene carbonate as the preferred high permittivity solvent and 1,2-dimethoxyethane as the preferred low viscosity solvent.

When the present electrochemical cell 10 is of a primary chemistry, the combined thicknesses of lithium as an anode active material 28, the separator 30, the cathode active material 34 and the cathode current collector 36 is substantially equal to or slightly greater than the distance measured from the inner surface 12B of the base plate 12 to the step 14E. That way, there is enough stack pressure inside the casing to provide intimate contact between the anode/cathode electrode assembly to ensure acceptable discharge for the primary chemistry cell.

Alternatively, when the electrochemical cell 10 is of a secondary chemistry, the combined thicknesses of the current collector 26, the first electrode active material 28, the separator 30, the opposite polarity electrode active material 34 and the second current collector 36 is somewhat less than the distance measured from the inner surface 12B of the base plate 12 to the step 14E. That way, there is enough free space inside the casing to accommodate expansion and contraction of the first and second electrode active materials stack or anode/cathode electrode assembly as the electrochemical cell 10 of the secondary chemistry is subjected to charge and discharge cycles.

In a primary system, with the first electrode active material 28/second, opposite polarity electrode active material 34 activated with the electrolyte and housed inside the casing comprising the casing base subassembly 18 (FIG. 4) hermetically sealed to the lid upper subassembly 20 (FIG. 5), the base plate 12 in electrical continuity with the first current collector 26/first electrode active material 28 assembly serves as a first terminal for the cell and the lid 16 welded to the annular sidewall 14 in contact with the second current collector 36/second electrode active material 34 assembly serves as the second, opposite polarity terminal.

In a primary system with lithium being the anode active material, the current collector 26 or current collector 36 is not needed and the lithium directly contacts the base plate 12 or lid 16, as the case may be, serving as the negative terminal. However, in a secondary lithium-ion electrochemical system having an exemplary carbon-based or $Li_4Ti_5O_{12}$-based anode material, the current collector 26 or 36 is needed. For example, a carbon-based or $Li_4Ti_5O_{12}$-based anode material 28 is first contacted to the current collector 26 and this assembly is then electrically connected to the base plate 12. A parallel gap welded process as previously described in detail with respect to the lid 16 is useful for electrically connecting the current collector 26 supporting the anode active material 28 to the inner surface 12B of the base plate 12 through a weld 42A (FIGS. 3 and 4).

As those skilled in the art will readily appreciate, in a primary and a secondary system, the cathode active material can be switched with the anode active material. In this alternate embodiment, the cathode active material in electrical continuity with base plate 12 serves as the positive terminal and the anode active material in continuity with the lid 16 welded to the annular sidewall 14 serves as the negative terminal.

With the base plate 12 having a surface area ranging from about 1 $mm^2$ to about 1 $cm^2$ (surface area of either of the upper and lower surfaces 12B, 12C), the upper surface 16B of the lid 16 and the upper edge 14B of the annular sidewall 14 having a combined surface area ranging from about 1 $mm^2$ to about 1 $cm^2$, and with the height of the casing as measured from the lower surface 12C of the base plate 12 to the upper edge 14B of the annular sidewall 14 ranging from about 250 μm to about 2.5 mm, the present electrochemical cell 10 represents an advancement in electrochemical technology. The cell can be built with a total volume that is less than 0.5 cc but, as a hermetically sealed enclosure, is capable of being implanted in human or animal body tissue for extended periods of time.

Further, a method for providing an electrochemical cell 10 according to the present invention comprises first providing a casing. That is done by providing a base plate 12 and an annular sidewall 14. The base plate 12 has an annular channel 12D that extends part-way into the thickness of the base plate and is spaced inwardly from the base plate's peripheral edge 12A. The annular sidewall 14 extends to an upper annular edge 14B spaced from a lower annular edge 14C, and an outer annular surface 14A spaced from an inner surface. The inner surface is provided with a step 14E. A dielectric material 22 is coated on the lower annular edge 14C and at least a portion of the inner surface of the annular sidewall 14.

Next, a ring-shaped sealing glass 24 is nested in the annular channel 12D of the base plate 12 and the annular sidewall 14 is seated on the glass. This subassembly is heated to form a glass-to-metal seal with the base plate 12 and a glass-to-ceramic seal with the dielectric material 22 at the lower annular edge 14C of the annular sidewall 14. If desired, the dielectric material 22 need only coat the lower cylindrically-shaped portion 14D of the annular sidewall.

That way, the sealing glass 24 seals directly to the base plate 12 and the annular sidewall 14.

A current collector 26 is provided and a first electrode active material 28 is contacted to the current collector. This assembly is supported on the inner surface 12B of the base plate, and then the current collector 26 is electrically and mechanically secured to the base plate 12 using the previously described parallel gap welding process with the welding electrodes 38, 40 contacted to the lower surface 12C of the base plate 12, opposite the current collector. The first electrode active material 28 is preferably spaced inwardly from the annular dielectric coating 22 on the inner surface of the lower cylindrically-shaped portion 14D of the annular sidewall 14. That way, the first electrode active material 28 is in electrical continuity with the base plate 12 through the current collector 26. The resulting weld between the base plate 12 and the current collector 26 securely binds those parts together with the base plate serving as one terminal for the cell. An annulus or annular gap is present between the first electrode active material 28 and the inner surface of the annular sidewall 14.

Separately, a second, opposite polarity electrode active material 34 is contacted to a second current collector 36 to form a second assembly.

A lid 16 is also provided. The lid 16 has an electrolyte fill port 32 extending through its thickness from a lid upper surface 16B to a spaced apart lid inner surface 16C. The lid 16 also has a recess 16D extending inwardly from the lid upper surface part-way into its thickness.

After the second electrode active material 34/second current collector 36 pre-assembly is formed, this assembly is contacted to the lid inner surface 16C using a parallel gap welding or series welding process. The resulting weld 42 between the lid 16 and the current collector 36 securely binds those parts together and provides a suitable electrically conductive pathway with the lid serving as a second, opposite polarity terminal for the cell. Further, the separator 30 segregates the first active material 28 from directed physical contact with the second active material 34 while allowing ionic conductivity via the electrolyte to flow therethrough.

The electrochemical cell is completed when the lid 16 is seated on the step 14E of the annular sidewall 14 and welded 44 to the upper annular edge 14B thereof. Importantly, the lid 16 is provided with an embossed rim 16E extending between its outer peripheral edge 16A and the recess 16D. When the lid 16 is welded to the annular sidewall 14, the material comprising the rim 16E provides sufficient material to both absorb heat created at the weld and to provide material that flows into the gap between the lid 16 and the sidewall 14 to provide a hermetic seal between these casing members. The heat absorbed by the rim 16E helps to prevent structural compromise of the glass-to-metal and glass-to-ceramic seals between the annular sidewall 14 and the base plate 12.

This is followed by filling an activating electrolyte into the casing through the electrolyte fill port 32 in the lid 16 and then closing the fill port. The electrolyte fill port 32 is axially aligned with the annulus 38 residing between the inner surface of the annular sidewall 14 and the electrode assembly. That way, electrolyte filled into the casing through the fill port 32 readily wets the separator 30 and electrode assembly to thereby promote extended cell discharge.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:

a) a casing, comprising:

i) an annular sidewall extending to an upper annular edge spaced from a lower annular edge, the annular sidewall having an outer surface spaced from an inner surface;

ii) a lid closing the upper annular edge of the annular sidewall, wherein the lid has a hermetically sealed electrolyte fill port that extends through a lid thickness from a lid upper surface to a spaced-apart lid inner surface;

iii) a base plate having a base plate thickness extending from a base plate inner surface to a spaced-apart base plate lower surface;

iv) a dielectric material coating the lower annular edge of the annular sidewall and at least a portion of the inner surface of the annular sidewall; and v) a ring-shaped sealing glass in a glass-to-metal seal relationship with the base plate and in a glass-to-ceramic seal relationship with the dielectric material coating the lower annular edge of the annular sidewall; and b) an electrode assembly housed inside the casing, the electrode assembly comprising:

i) a first current collector;

ii) a first electrode active material contacted to the first current collector;

iii) a first weld connecting the first current collector contacting the first electrode active material to an inner surface of the one of the lid and the base plate without the first weld extending completely through the one of the lid thickness and the base plate thickness;

iv) a second, opposite polarity electrode active material; and v) a separator segregating the first and second electrode active materials from directed physical contact with each other, vi) wherein the first current collector contacting the first electrode active material is in electrical continuity with one of the lid and the base plate serving as a first terminal for the cell, and wherein the second electrode active material is in electrical continuity with the other of the lid and the base plate serving as a second, opposite polarity terminal for the cell; and c) an electrolyte in the casing to activate the electrode assembly.

2. The electrochemical cell of claim 1, wherein second electrode active material is contacted to a second current collector, and wherein a second weld connects the second current collector contacting the second electrode active material to an inner surface of the other of the lid and the base plate without the second weld extending completely through the other of the lid thickness and the base plate thickness.

3. The electrochemical cell of claim 1, wherein the base plate has a base plate peripheral edge and an annular channel that is spaced inwardly from the base plate peripheral edge, the annular channel extending part-way into the thickness of the base plate from the base plate inner surface, and wherein the sealing glass resides in the annular channel of the base plate to form the glass-to-metal seal with the base plate and the glass-to-ceramic seal with the dielectric material at the lower annular edge of the annular sidewall.

4. The electrochemical cell of claim 1, wherein the sealing glass forms the glass-to-ceramic seal with the dielectric material at the lower annular edge and at the inner and outer surfaces of the annular sidewall.

5. The electrochemical cell of claim 1, wherein the dielectric material is an alumina ($Al_2O_3$).

6. The electrochemical cell of claim 1, wherein an annulus resides between the inner surface of the annular sidewall and the electrode assembly, and the electrolyte fill port is axially aligned with the annulus.

7. The electrochemical cell of claim 1, wherein the inner surface of the annular sidewall is provided with a step, and wherein the lid is seated on the step.

8. The electrochemical cell of claim 1, wherein the upper surface of the lid is substantially co-planar with the upper annular edge of the annular sidewall.

9. The electrochemical cell of claim 1, wherein the electrolyte fill port is either welded closed or provided with a closure plug that is welded to the lid to hermetically seal the electrolyte fill port.

10. The electrochemical cell of claim 1, wherein a recess extends inwardly from the lid upper surface part-way into the thickness of the lid to thereby provide an annular rim extending between an outer peripheral edge of the lid and the recess, and wherein the lid is welded to the annular sidewall with material comprising the annular rim at least partially filling into a gap between the lid and the annular sidewall.

11. The electrochemical cell of claim 1, wherein one of the first and second electrode active materials is an anode active material selected from the group of coke, graphite, acetylene black, carbon black, glass carbon, hairy carbon, $Li_4Ti_5O_{12}$, lithiated silver vanadium oxide, lithiated copper silver vanadium oxide, lithiated copper sulfide, lithiated iron sulfide, lithiated iron disulfide, lithiated titanium disulfide, lithiated copper vanadium oxide, $Li_xCu_wAg_yV_2O_z$ with $0.5 \leq x \leq 4.0$, $0.01 \leq w \leq 1.0$, $0.01 \leq y \leq 1.0$ and $5.01 \leq z$ v 6.5, lithium, and mixtures thereon, and wherein the other of the first and second electrode active materials is a cathode active material selected from the group of lithium nickel manganese cobalt oxide ($LiNi_aMn_bCo_{1-a-b}$ $O_2$), $LiCoO_2$, $LiNiO_2$, $LiMnO_2$, TiS, FeS, $FeS_2$, $CF_x$, $Ag_2O$, $Ag_2O_2$, $Ag_2CrO_4$, silver vanadium oxide (SVO), copper silver vanadium oxide (CSVO), $V_2O_5$, $MnO_2$.

12. The electrochemical cell of claim 1 having a total volume that is less than 0.5 cc.

* * * * *